US011184105B2

(12) United States Patent
Tsujimaru

(10) Patent No.: US 11,184,105 B2
(45) Date of Patent: Nov. 23, 2021

(54) COMMUNICATION APPARATUS, COMMUNICATION METHOD THEREOF, INFORMATION PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Yuki Tsujimaru, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/841,993

(22) Filed: Apr. 7, 2020

(65) Prior Publication Data

US 2020/0343994 A1 Oct. 29, 2020

(30) Foreign Application Priority Data

Apr. 24, 2019 (JP) .............................. JP2019-083214

(51) Int. Cl.
*H04W 4/00* (2018.01)
*H04L 1/00* (2006.01)
*H04W 84/12* (2009.01)

(52) U.S. Cl.
CPC .......... *H04L 1/0003* (2013.01); *H04L 1/0009* (2013.01); *H04W 84/12* (2013.01)

(58) Field of Classification Search
CPC ..... H04L 1/0003; H04L 1/0009; H04W 84/12
(Continued)

(56) References Cited

U.S. PATENT DOCUMENTS

2015/0245320 A1* 8/2015 Chen .................... H04L 5/0069
370/329
2016/0037444 A1* 2/2016 Jung ................. H04W 52/0203
370/338

(Continued)

FOREIGN PATENT DOCUMENTS

JP 2018-050133 A 3/2018

OTHER PUBLICATIONS

Mahmoud Aldababsa et al., "A Tutorial on Nonorthogonal Multiple Access for 5G and Beyond," Jun. 28, 2018, Wireless Communications and Mobile Computing vol. 2018, Article ID 9713450, pp. 1-24.*

(Continued)

*Primary Examiner* — Tesfaldet Bocure
(74) *Attorney, Agent, or Firm* — Venable LLP

(57) ABSTRACT

A communication apparatus includes one or more processors, and one or more memories that stores a computer-readable instruction for causing, when executed by the one or more processors, the communication apparatus to transmit to or receive from a communication partner apparatus, a radio frame compliant with an IEEE802.11 standard series. If the communication apparatus can use NOMA (Non-Orthogonal Multiple Access), the communication apparatus includes, into a MAC (Medium Access Control) frame of the radio frame, information indicating that the communication apparatus supports NOMA, and if the communication apparatus cannot use NOMA, the communication apparatus does not include, into the MAC frame of the radio frame, information indicating that the communication apparatus supports NOMA.

12 Claims, 4 Drawing Sheets

(58) Field of Classification Search
USPC .......................................... 370/338; 375/377
See application file for complete search history.

(56) References Cited

U.S. PATENT DOCUMENTS

| | | |
|---|---|---|
| 2016/0183360 A1 | 6/2016 | Min et al. |
| 2018/0152257 A1* | 5/2018 | Seo ..................... H04L 27/3488 |
| 2019/0305877 A1* | 10/2019 | Lee ........................ H04W 74/08 |
| 2020/0015218 A1* | 1/2020 | Lee ........................ H04L 5/0044 |
| 2020/0329526 A1* | 10/2020 | Takada .................. H04W 84/02 |

OTHER PUBLICATIONS

Eneko Iradier Gil, "NOMA-based 802.11 g/n: PHY analysis and MAC implementation", Universidad del Pais Vascoo, Sep. 24, 2018, pp. 1-73.*

* cited by examiner

NOMA element format

COMMUNICATION APPARATUS, COMMUNICATION METHOD THEREOF, INFORMATION PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to a communication control technique in a wireless LAN.

Description of the Related Art

Along with the increase in data amount to be communicated in recent years, communication techniques such as a wireless LAN (Local Area Network) have been developed. As a major communication standard of the wireless LAN, the IEEE (Institute of Electrical and Electronics Engineers) 802.11 standard series is known. The IEEE802.11 standard series includes standards such as IEEE802.11a/b/g/n/ac/ax. For example, in the latest standard, IEEE802.11ax, a technique that uses OFDMA (Orthogonal Frequency-Division Multiple Access) to implement a high peak throughput of up to 9.6 gigabits per second (Gbps) and additionally improve the communication speed under a congestion situation has been standardized (see Japanese Patent Laid-Open No. 2018-050133).

On the other hand, in order to further improve throughput, a study group called IEEE802.11EHT (Extremely High Throughput) has been formed as a successor standard of IEEE802.11ax. In IEEE802.11EHT, introduction of a NOMA (Non-Orthogonal Multiple Access) scheme is being studied to improve throughput.

It can be useful that a communication apparatus that has received a radio frame rapidly checks whether NOMA is used in data transmission using the radio frame. On the other hand, NOMA is not used in the conventional standards. Therefore, there is no mechanism for the communication apparatus to recognize whether a partner apparatus can perform communication using NOMA. Similarly, there is no mechanism for the partner apparatus to recognize whether the communication apparatus can use NOMA.

SUMMARY OF THE INVENTION

The present invention provides a technique that enables at least either one of a communication apparatus and a partner apparatus to recognize the NOMA capability of the other apparatus.

According to one aspect of the present invention, there is provided a communication apparatus comprising: one or more processors; and one or more memories that stores a computer-readable instruction for causing, when executed by the one or more processors, the communication apparatus to: transmit to or receive from a communication partner apparatus, a radio frame compliant with an IEEE802.11 standard series, wherein NOMA (Non-Orthogonal Multiple Access) capability of the apparatus that has transmitted the radio frame is indicated in a MAC (Medium Access Control) frame of the radio frame.

According to another aspect of the present invention, there is provided an information processing apparatus, comprising: one or more processors; and one or more memories that stores a computer-readable instruction for causing, when executed by the one or more processors, the information processing apparatus to generate a radio frame compliant with an IEEE802.11 standard series, wherein NOMA (Non-Orthogonal Multiple Access) capability of the apparatus that has transmitted the radio frame is indicated in a MAC (Medium Access Control) frame of the radio frame.

Further features of the present invention will become apparent from the following description of exemplary embodiments (with reference to the attached drawings).

DESCRIPTION OF THE EMBODIMENTS

Figure 1:
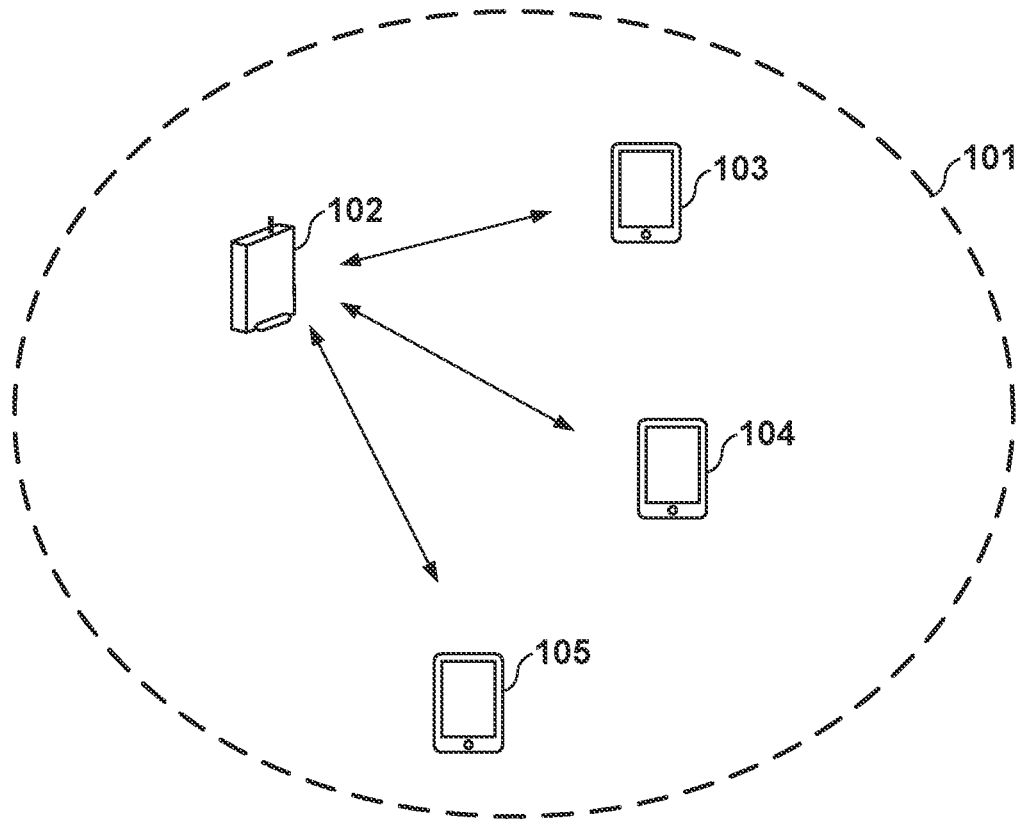
FIG. 1 is a view showing a configuration example of a wireless communication network.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows a configuration example of a wireless communication network according to this embodiment. This wireless communication network includes one access point (AP) and three stations (STAs). Here, each of an AP 102 and STAs 103 to 105 is compliant with an IEEE802.11EHT (Extremely High Throughput) standard, and is configured to be capable of performing wireless communication compliant with standards defined before the IEEE802.11EHT standard. Note that the name "IEEE802.11EHT" is provided for convenience, and can be another name when the standard was established, but this specification and the appended claims are to cover all the standards that can support the processing to be described later. Further, it may be understood that EHT is an acronym of Extreme High Throughput. Note that the following description may be applied to a system other than a wireless LAN.

In the following description, in a case in which a specific apparatus is not referred to or the like, the access point (base station) may be referred to as "AP" and the station (terminal) may be referred to as "STA" without reference numerals. Note that in FIG. 1, the wireless communication network including one AP and three STAs is shown as an example, but the numbers of these communication apparatuses may be more or less than shown. In an example, no AP may exist when the STAs communicate with each other. In addition, the AP 102 may be a group owner compliant with the Wi-Fi® Direct standard, and the STAs 103 to 105 may be clients of the Wi-Fi Direct standard. In FIG. 1, the communicable area of the network formed by the AP 102 is indicated by a circle 101. Note that this communicable area may cover a larger area, or may cover only a smaller area.

In this embodiment, it is assumed that a NOMA scheme can be used to transmit and/or receive data between the AP 102 and the STAs 103 to 105. NOMA is an acronym of Non-Orthogonal Multiple Access. In communication using the NOMA scheme, a plurality of independent signals (not orthogonal to each other) to each of which power is appropriately assigned are transmitted in parallel at the same time using a common frequency channel. Thus, the radio resource is effectively used, and the overall system throughput can be improved.

(Arrangement of Apparatus)

Figure 2:
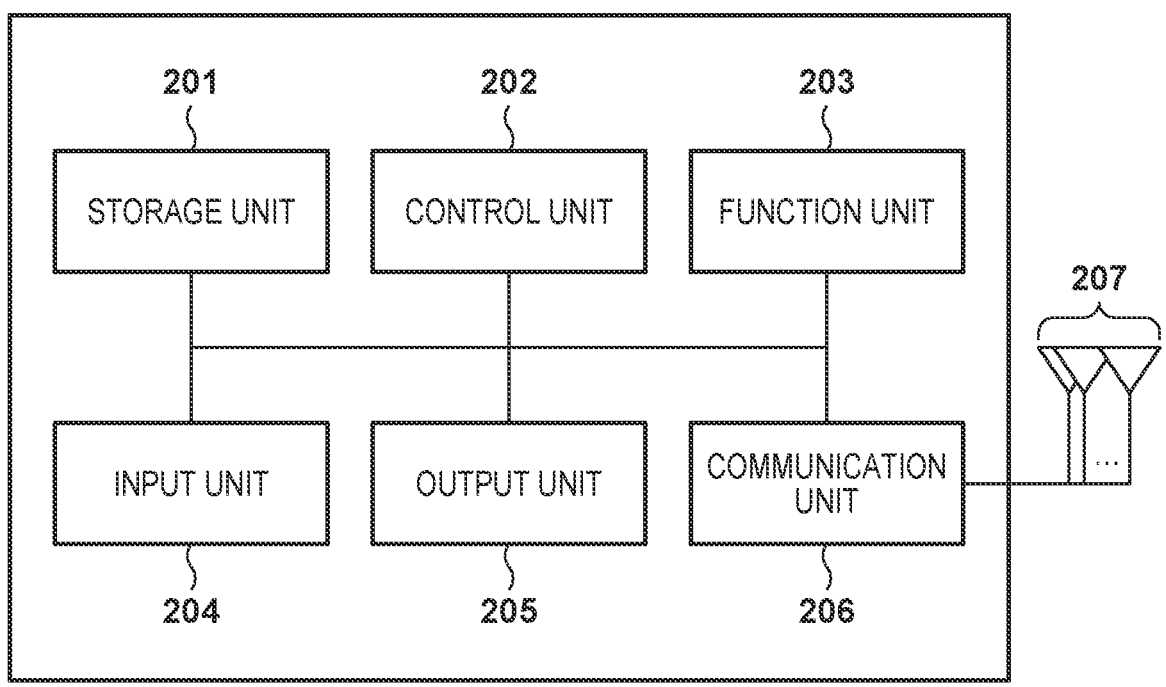
FIG. 2 is a block diagram showing an example of the hardware arrangement of a communication apparatus.

FIG. 2 shows an example of the hardware arrangement of each of the communication apparatuses (AP and STAs). The communication apparatus includes, as an example of its arrangement, a storage unit 201, a control unit 202, a function unit 203, an input unit 204, an output unit 205, a communication unit 206, and an antenna 207.

The storage unit 201 is formed by one or more memories, that is, both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a non-volatile memory card, or a DVD may be used as the storage unit 201.

The control unit 202 is formed by, for example, one or more processors such as a CPU and an MPU, an ASIC (Application Specific Integrated Circuit), a DSP (Digital Signal Processor), an FPGA (Field Programmable Gate Array), or the like. Note that the processor may be a single-core processor or a multicore processor. Here, CPU is an acronym of Central Processing Unit, and MPU is an acronym of Micro Processing Unit. The control unit 202 executes the programs stored in the storage unit 201, thereby controlling the entire apparatus. Note that the control unit 202 may control the entire apparatus by cooperation of the programs stored in the storage unit 201 and an OS (Operating System).

In addition, the control unit 202 controls the function unit 203 to execute a predetermined process such as image capturing, printing, or projection. The function unit 203 is hardware used by the apparatus to perform a predetermined process. For example, if the apparatus is a camera, the function unit 203 is an image capturing unit and performs an image capturing process. For example, if the apparatus is a printer, the function unit 203 is a printing unit and performs a printing process. For example, if the apparatus is a projector, the function unit 203 is a projection unit and performs a projection process. Data to be processed by the function unit 203 may be data stored in the storage unit 201, or may be data communicated with another AP or STA via the communication unit 206 to be described later.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like. Note that both the input unit 204 and the output unit 205 may be implemented by one module, like a touch panel.

The communication unit 206 controls wireless communication compliant with the IEEE802.11 standard series, or controls IP (Internet Protocol) communication. The communication unit 206 is a so-called radio chip, and may itself include one or more processors and memories. In this embodiment, the communication unit 206 can execute processing compliant with at least the IEEE802.11EHT standard. In addition, the communication unit 206 controls the antenna 207 to transmit and/or receive radio signals for wireless communication. The apparatus communicates contents such as image data, document data, or video data with another communication apparatus via the communication unit 206. The antenna 207 is an antenna that can transmit and/or receive signals in at least any one of, for example, a sub-GHz band, 2.4 GHz band, 5 GHz band, and 6 GHz band. Note that the frequency band (and a combination of frequency bands) to which the antenna 207 is adaptable is not particularly limited. The antenna 207 may be one antenna, or may be a set of two or more antennas to perform MIMO (Multi-Input and Multi-Output) transmission/reception as shown in FIG. 2. In addition, the antenna 207 may be formed by two or more antennas (two or more sets of antennas) that are adaptable to different frequency bands, for example.

Figure 3:
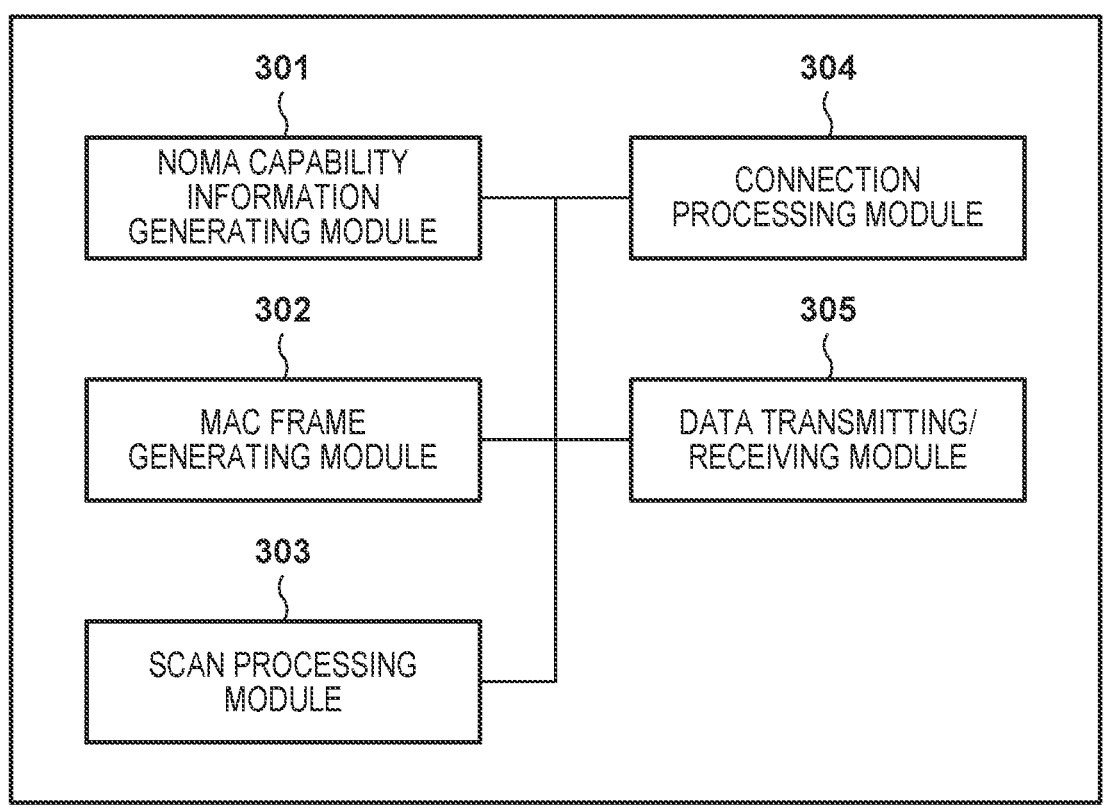
FIG. 3 is a block diagram showing an example of the functional arrangement of the communication apparatus.

FIG. 3 shows an example of the functional arrangement of each of the communication apparatuses (AP and STAs). As an example, the communication apparatus includes a NOMA capability information generating module 301, a MAC frame generating module 302, a scan processing module 303, a connection processing module 304, and a data transmitting/receiving module 305.

The NOMA capability information generating module 301 generates information indicating whether the communication apparatus can use NOMA, or the like. The MAC frame generating module 302 generates the MAC (Medium Access Control) frame of a radio frame transmitted by the communication apparatus. The MAC frame generating module 302 generates the MAC frame storing the NOMA capability information generated by the NOMA capability information generating module 301 as needed. Here, a radio frame transmitted including the MAC frame can be any one of a beacon frame, a probe request frame, and a probe response frame. In addition, the radio frame may be either one of an association request frame and an association response frame. Further, the radio frame may be either one of a reassociation request frame and a reassociation response frame. Note that the NOMA capability information generating module 301 may not generate the information if NOMA cannot be used. In this case, the MAC frame generating module 302 may implicitly indicate that NOMA cannot be used by including, in the MAC frame, no information as to whether NOMA can be used.

The scan processing module 303 executes processing for allowing the STA to obtain network information of the AP. For example, when the communication apparatus is the STA, the scan processing module 303 executes processing of receiving a beacon frame from the surrounding AP, transmitting a probe request frame, and receiving a probe response frame from the AP. When the communication apparatus is the AP, the scan processing module 303 executes processing of transmitting a beacon frame, and transmitting a probe response frame if a probe request frame is received from the STA. The connection processing module 304 executes processing for allowing the STA to connect to the network managed by the AP. When the communication apparatus is the STA, the connection processing module 304 transmits an association request frame to the AP and receives an association response frame from the AP. When the communication apparatus is the AP, the connection processing module 304 receives an association request frame from the STA and transmits an association response frame to the STA as a response to the received frame. In scan processing by the scan processing module 303 and connection processing by the connection processing module 304, NOMA capability information is exchanged between the AP and the STA.

If it is determined that data transmission/reception using NOMA is performed, the data transmitting/receiving module 305 transmits/receives a data frame multiplexed using the NOMA scheme. Note that if it is determined that data transmission/reception using NOMA is not performed, the data transmitting/receiving module 305 may perform data transmission/reception in accordance with a conventional standard such as IEEE802.11ax.

(Procedure of Processing)

Figure 4:
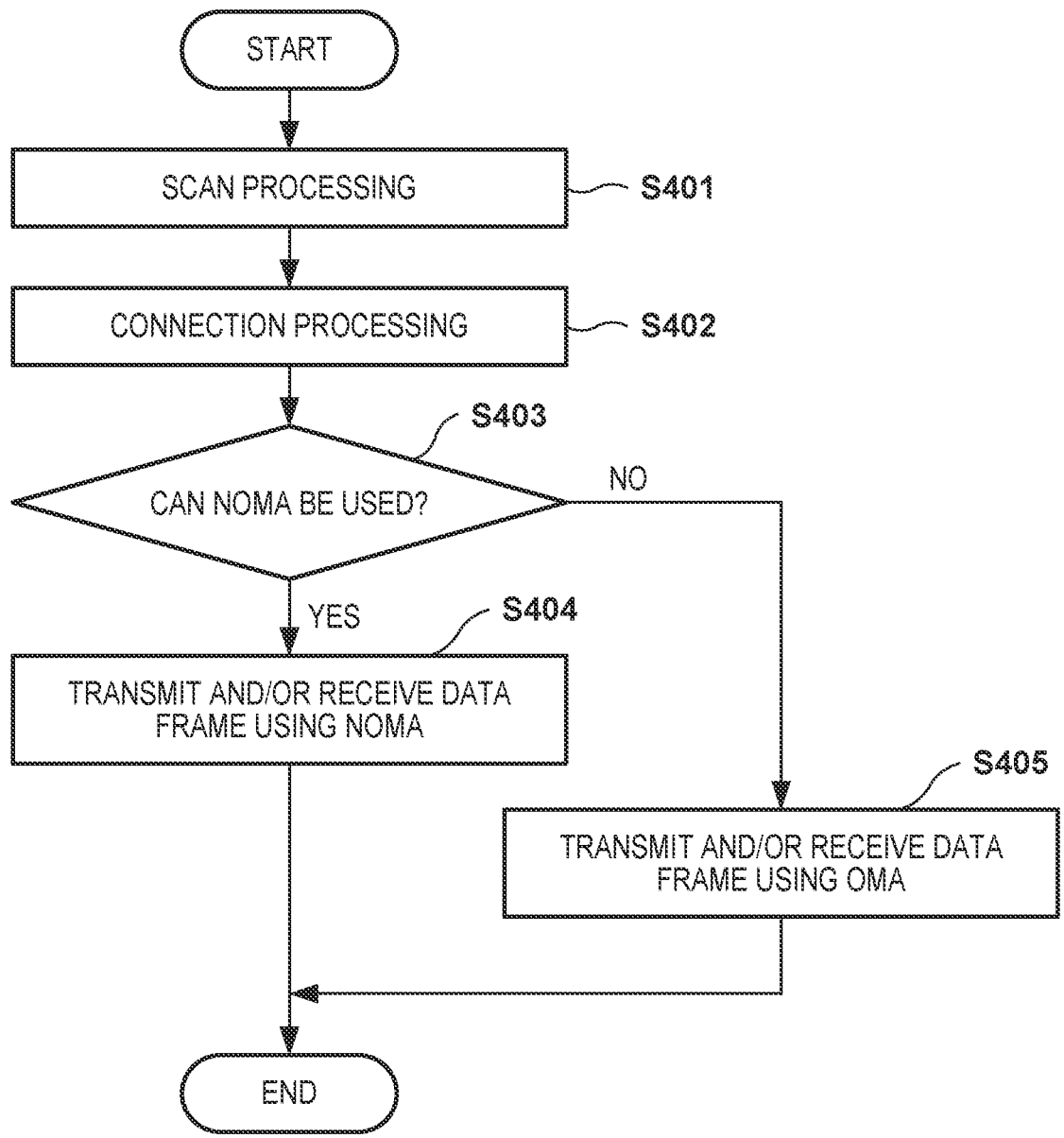
FIG. 4 is a flowchart illustrating an example of the procedure of processing executed by the communication apparatus.

Next, an example of the procedure of processing executed by the communication apparatus will be described with reference to FIG. 4. In the processing illustrated in FIG. 4, the communication apparatus (AP or STA) first executes scan processing (step S401). When the communication apparatus is the STA, the communication apparatus receives a beacon frame transmitted by the AP, so that it can obtain network information of the AP. Alternatively, in this case, the communication apparatus may obtain network information of the AP by actively transmitting a probe request frame and receiving a probe response frame from the AP. Here, in this embodiment, the NOMA capability information of the AP can be included in each of a beacon frame and a probe response frame transmitted by the AP compliant with IEEE802.11EHT. In addition, the NOMA capability information of the STA can be included in a probe request frame transmitted by the STA compliant with IEEE802.11EHT. By the scan processing as described above, the NOMA capability information is exchanged between the STA and the AP.

Subsequently, the communication apparatus executes connection processing with the partner apparatus (step S402). When the communication apparatus is the STA, the communication apparatus transmits an association request frame to the AP, and receives an association response frame from the AP as a response including a connection result. When the communication apparatus is the AP, in response to reception of an association request frame from the STA, the communication apparatus transmits an association response frame to the STA as a response including a connection result. It is also possible to include the NOMA capability information of its transmitter in each of the association request frame and the association response frame. In an example, the STA can determine, based on the NOMA capability information of the AP obtained in scan processing, the NOMA capability information to be included in the association request frame. For example, if the self-apparatus can use NOMA but the AP cannot use NOMA, the STA may indicate, in the NOMA capability information in the association request frame, that the self-apparatus cannot use NOMA. Similarly, the AP may determine, based on the NOMA capability information of the STA included in the association request frame, the NOMA capability information of the self-apparatus to be included in the association response frame.

The communication apparatus determines, based on the NOMA capability information or the like exchanged in the connection processing, whether NOMA can be used in communication with the partner apparatus (step S403). Then, when the self-apparatus transmits a data frame, if it is determined that the self-apparatus and the partner apparatus can use NOMA (YES in step S403), the communication apparatus generates and transmits a data frame multiplexed using NOMA (step S404). When the self-apparatus receives a data frame, if it is determined that the self-apparatus and the partner apparatus can use NOMA (YES in step S403), the communication apparatus extracts information addressed to the self-apparatus from the data frame multiplexed using NOMA. On the other hand, when the self-apparatus transmits a data frame, if it is determined that NOMA cannot be used (NO in step S403), the communication apparatus can generate and transmit a radio frame using an OMA (Orthogonal Multiple Access) scheme compliant with the IEEE802.11ax standard or the like (step S405). When the self-apparatus receives a data frame, if it is determined that NOMA cannot be used (NO in step S403), the communication apparatus extracts data addressed to the self-apparatus in accordance with a scheme used by the transmitting apparatus to transmit the data frame.

Note that information indicating whether NOMA is used in the data frame or information of parameters to be used when the data multiplexed using NOMA is extracted may be included in the data frame. The information as described above can be included in a MAC frame (MAC header), a physical layer (PHY), or the like of the data frame. The apparatus that has received the data frame can use the information to specify whether NOMA is actually used. The parameters can include, for example, for each multiplexed data, information indicating the destination, information indicating the necessity of SIC (Successive Interference Cancellation), information indicating the index of the MCS (Modulation and Coding Scheme) to be used, and information indicating the transmission power. The communication apparatus can use these parameters to execute processing for extracting data addressed to the self-apparatus. For example, when a data frame is received, if it is indicated that SIC is necessary for data addressed to the self-apparatus, the communication apparatus executes a successive interference cancellation procedure based on the MCS used in data addressed to another receiving apparatus to obtain data addressed to the self-apparatus. That is, for example, the receiving apparatus executes demodulation or the like of the signal components addressed to the other receiving apparatus using the modulation scheme or the like of the other receiving apparatus, and subtracts a replica of the signal components from the received signal, thereby obtaining the signal components obtained by canceling the signal components addressed to the other receiving apparatus. By repeatedly executing such signal component cancellation of the signal components addressed to the other major communication apparatus (for example, the other communication apparatus having higher transmission power than the self-apparatus), the receiving apparatus can obtain the signal components mainly including the signal components addressed to the self-apparatus. By using the signal components obtained as a result of cancelation of the signal components addressed to the other receiving apparatus, the receiving apparatus can execute processing such as demodulation in a state in which the influence of interference has been eliminated. At this time, the receiving apparatus may use the information of the transmission power of data addressed to the self-apparatus and that addressed to the other receiving apparatus to correct the size of the pilot signal of the signal to be canceled. This makes it possible to more accurately equalize, demodulate, and cancel the signal to be canceled. Note that if it is indicated that SIC is unnecessary for data addressed to the self-apparatus, the receiving apparatus obtains data addressed to the self-apparatus without performing SIC. Note that at this time, the receiving apparatus may also use the value of the transmission power of data addressed to the self-apparatus and that addressed to the other receiving apparatus to correct the size of the pilot signal. This makes it possible to more accurately equalize and demodulate the signal. Note that if predetermined parameters are used or if the predetermined procedure is used, the receiving apparatus can execute receiving processing for obtaining data addressed to the self-apparatus without referring to these parameters. Information indicating whether NOMA is used in data frame transmission/reception and parameters used when NOMA is used may be exchanged, for example, at a timing different from data frame transmission/reception during the connection processing in step S402 or the like.

Figure 5:
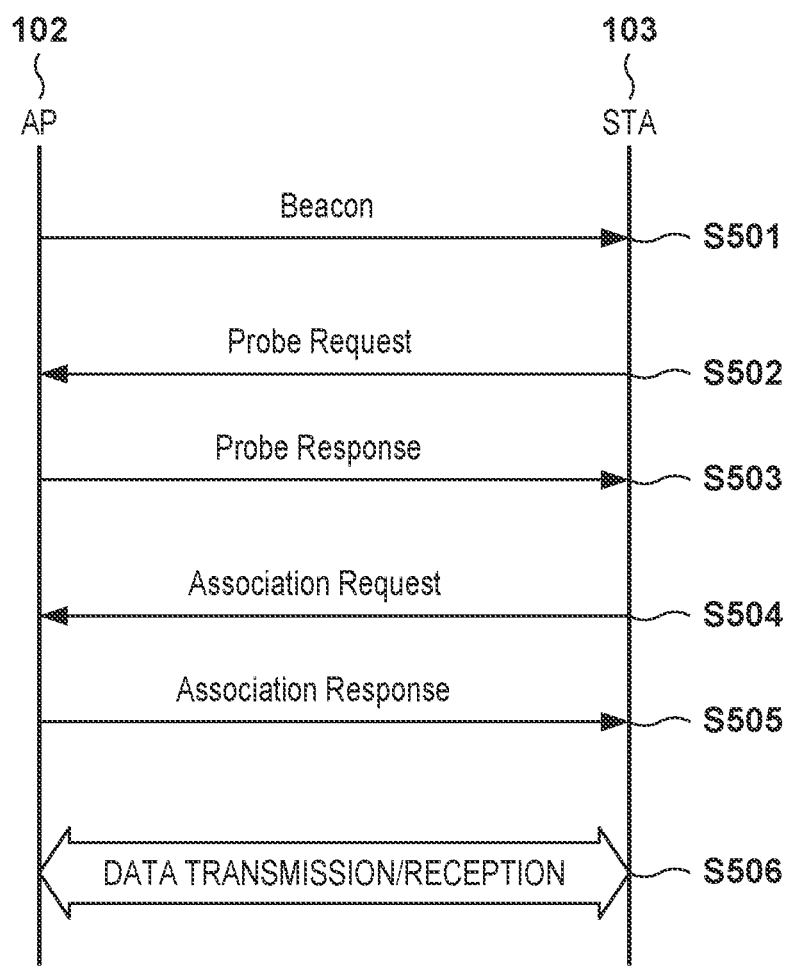
FIG. 5 is a sequence chart showing an example of the procedure of processing related to communication in the wireless communication network.

Subsequently, an example of the procedure of processing executed between the AP and the STA until data transmission/reception is performed will be described with reference to FIG. 5. The AP and the STA execute scan processing, for example, as in steps S501 to S503. That is, the AP can transmit a beacon frame including the NOMA capability information of the self-apparatus (step S501). The beacon frame is transmitted at a predetermined cycle, for example, 100 msec. Further, the STA can transmit a probe request frame including the NOMA capability information of the self-apparatus (step S502). In this case, in response to reception of the probe request frame, the AP transmits a probe response frame including the NOMA capability information of the self-apparatus (step S503). Then, the STA receives the probe response frame. Thus, the AP and the STA can obtain the NOMA capability information of the partner apparatus.

Then, the AP and the STA execute connection processing, for example, as in steps S504 and S505. That is, the STA transmits an association request frame including the NOMA capability information of the self-apparatus to the AP (step S504). When the association request frame is received, the AP returns a response including a connection result to the STA using an association response frame including the NOMA capability information of the self-apparatus (step S505). Note that when the STA performs roaming to another AP, a reassociation request frame is used instead of the association request frame. Further, in this case, a reassociation response frame is used instead of the association response frame. That is, in this case, the reassociation request frame is transmitted in step S504, and the reassociation response frame is transmitted in step S505. Note that the NOMA information may be exchanged in only one of processing in steps S501 to S503 and processing in steps S504 and S505, or may be exchanged in both processing operations. The AP and the STA determine, based on the NOMA capability information exchanged in the connection processing in steps S504 and S505, whether to use NOMA in transmission/reception of a data frame. Then, the AP and the STA perform transmission/reception of the data frame based on the determination (step S506).

Figure 6:
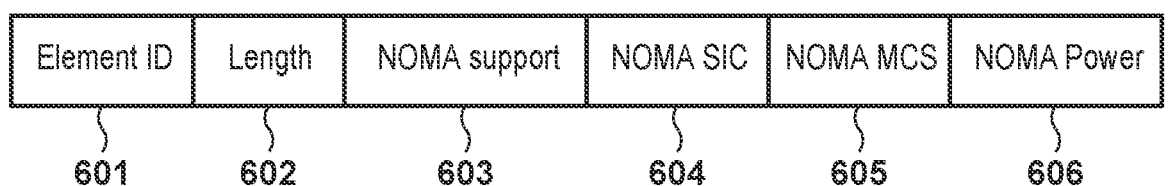
FIG. 6 is a view showing an example of the structure of a NOMA element.

FIG. 6 shows an example of NOMA capability information (NOMA element). The NOMA element is information that can be added to a MAC frame in a radio frame. The radio frame can be a beacon frame, a probe request/response frame, an association request/response frame, or a reassociation request/response frame. Similar to another information element defined by the IEEE 802.11 standard, the NOMA element includes an element ID field 601 for identifying the information element, and a length field 602 indicating the data length of the information element. In addition, as information unique to a NOMA element, the NOMA element includes a NOMA support field 603, a NOMA SIC field 604, a NOMA MCS field 605, and a NOMA power field 606.

The NOMA support field 603 stores information indicating whether NOMA can be used. For example, a value "0" indicates that NOMA cannot be used, and a value "1" indicates that NOMA can be used. Note that whether NOMA can be used may be indicated not using the NOMA support field 603 but the presence/absence of the NOMA element itself in the MAC frame. The NOMA SIC field 604 stores information indicating whether SIC can be used. For example, a value "0" indicates that SIC cannot be used, and a value "1" indicates that SIC can be used. The NOMA MCS field 605 stores information indicating whether one or more MCSs can be used. In the NOMA MCS field 605, for example, for each of one or more MCSs, a value "0" indicates that the MCS cannot be used, and a value "1" indicates that the MCS can be used. The NOMA MCS field 605 can be provided as a field of the number of bits (for example, 11 bits) capable of identifying the usable MCS. The NOMA power field 606 stores the value of usable transmission power. For example, information indicating the maximum value and minimum value of power that the communication apparatus can use to transmit data is stored in the NOMA power field 606. Further, the power range of a signal that the communication apparatus can receive may be stored in the NOMA power field 606. That is, the NOMA power field 606 may indicate the maximum or minimum power with which a signal can be accurately received. Each of these values can be indicated as a floating point constant or an integer constant. In these cases, the NOMA power field 606 can be provided as an 8-bit, 16-bit, 32-bit, or 64-bit field. In addition, each combination of a plurality of values designated in advance may be associated with an index, and the maximum and minimum values of the transmission power may be designated by designating one of the indices. Alternatively, only one of the maximum value and the minimum value of the transmission power may be designated using the NOMA power field 606. Note that the name, bit position, and size of each field described above are not limited to those shown in the example in FIG. 6, and similar information may be stored using a different field name, in different order, or in different size. Also, not all of the above-described fields need to be included in the NOMA element, and only some of them may be included in the NOMA element. For example, when the usable MCS and the transmission power are known in advance, the NOMA SIC field 604 alone may be included in the NOMA element. Further, the NOMA SIC field 604 may not be included in the NOMA element, and at least either one of the NOMA MCS field 605 and the NOMA power field 606 may be included in the NOMA element.

As has been described above, when a radio frame is received, the communication apparatus can rapidly recognize information related to the NOMA capability of the partner apparatus. In addition, the communication apparatus can inform the partner apparatus of information related to the NOMA capability of the self-apparatus. Thus, communication using NOMA can be appropriately performed between the communication apparatus and the partner apparatus. Note that in addition to the AP 102 and STAs 103 to 105 serving as communication apparatuses, the present invention can be implemented by an information processing apparatus (for example, a radio chip) that generates a radio frame including the MAC frame described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-083214, filed Apr. 24, 2019 which is hereby incorporated by reference herein in its entirety.

What is claimed is:

1. A communication apparatus comprising:
one or more processors; and
one or more memories that stores a computer-readable instruction for causing, when executed by the one or more processors, the communication apparatus to:
transmit to or receive from a communication partner apparatus, a radio frame compliant with an IEEE802.11 standard series,
wherein if the communication apparatus can use NOMA (Non-Orthogonal Multiple Access), the communication apparatus includes, into a MAC (Medium Access Control) frame of the radio frame, information indicating that the communication apparatus supports NOMA, and
if the communication apparatus cannot use NOMA, the communication apparatus does not include, into the MAC frame of the radio frame, information indicating that the communication apparatus supports NOMA.

2. The apparatus according to claim 1, wherein
if the communication apparatus can use NOMA, the communication apparatus includes, into the radio frame, information indicating whether the communication apparatus can use SIC (Successive Interference Cancellation) is further included in the radio frame.

3. The apparatus according to claim 1, wherein
information indicating an MCS (Modulation and Coding Scheme) which the communication apparatus can use is further included in the radio frame.

4. The apparatus according to claim 1, wherein
information indicating power which the communication apparatus can use for transmission or reception is further included in the radio frame.

5. The apparatus according to claim 1, wherein
the communication apparatus is informed of a radio frame including a MAC frame in which information indicating that the partner apparatus supports NOMA is included if the partner apparatus can use NOMA, and in which information indicating that the partner apparatus supports NOMA is not included if the partner apparatus cannot use NOMA.

6. The apparatus according to claim 5, wherein
the communication apparatus determines whether to use NOMA, based on whether or not the partner apparatus supports NOMA and whether or not the communication apparatus support NOMA.

7. The apparatus according to claim 1, wherein
the radio frame including the MAC frame is any one of a beacon frame, a probe request frame, a probe response frame, an association request frame, an association response frame, a reassociation request frame, and a reassociation response frame.

8. An information processing apparatus, comprising:
one or more processors; and
one or more memories that stores a computer-readable instruction for causing, when executed by the one or more processors, the information processing apparatus to
generate a radio frame compliant with an IEEE802.11 standard series,
wherein if a communication apparatus can use NOMA (Non-Orthogonal Multiple Access), the information processing apparatus includes, into a MAC (Medium Access Control) frame of the radio frame, information indicating that the communication apparatus supports NOMA, and
if the communication apparatus cannot use NOMA, the information processing apparatus does not include, into the MAC frame of the radio frame, information indicating that the communication apparatus supports NOMA.

9. A communication method performed by a communication apparatus, comprising:
transmitting to or receiving from a communication partner apparatus, a radio frame compliant with an IEEE802.11 standard series,
wherein if the communication apparatus can use NOMA (Non-Orthogonal Multiple Access), information indicating that the communication apparatus supports NOMA is included into a MAC (Medium Access Control) frame of the radio frame, and
if the communication apparatus cannot use NOMA, information indicating that the communication apparatus supports NOMA is not included into the MAC frame of the radio frame.

10. A control method performed by an information processing apparatus, comprising:
generating a radio frame compliant with an IEEE802.11 standard series, wherein if a communication apparatus can use NOMA (Non-Orthogonal Multiple Access), information indicating that the communication apparatus supports NOMA is included into a MAC (Medium Access Control) frame of the radio frame, and if the communication apparatus cannot use NOMA, information indicating that the communication apparatus supports NOMA is not included into the MAC frame of the radio frame.

11. A non-transitory computer-readable storage medium that stores a computer program for causing, when executed by one or more processors included in a communication apparatus, the communication apparatus to transmit to or receive from a communication partner apparatus, a radio frame compliant with an IEEE802.11 standard series, wherein if the communication apparatus can use NOMA (Non-Orthogonal Multiple Access), information indicating that the communication apparatus supports NOMA is included into a MAC (Medium Access Control) frame of the radio frame, and if the communication apparatus cannot use NOMA, information indicating that the communication apparatus supports NOMA is not included into the MAC frame of the radio frame.

12. A non-transitory computer-readable storage medium that stores a computer program for causing, when executed by one or more processors included in an information processing apparatus, the information processing apparatus to generate a radio frame compliant with an IEEE802.11 standard series, wherein if a communication apparatus can use NOMA (Non-Orthogonal Multiple Access), information indicating that the communication apparatus supports NOMA is included into a MAC (Medium Access Control) frame of the radio frame, and if the communication apparatus cannot use NOMA, information indicating that the communication apparatus supports NOMA is not included into the MAC frame of the radio frame.

* * * * *